B. DE MATTIA.
MACHINE FOR CUTTING AND FEEDING TIRE MAKING FABRIC.
APPLICATION FILED MAR. 9, 1920.

1,428,420.

Patented Sept. 5, 1922.
8 SHEETS—SHEET 3.

WITNESSES

INVENTOR
Barthold De Mattia
BY
ATTORNEYS

Patented Sept. 5, 1922.

1,428,420

UNITED STATES PATENT OFFICE.

BARTHOLD DE MATTIA, OF CLIFTON, NEW JERSEY.

MACHINE FOR CUTTING AND FEEDING TIRE-MAKING FABRIC.

Application filed March 9, 1920. Serial No. 364,533.

*To all whom it may concern:*

Be it known that I, BARTHOLD DE MATTIA, a citizen of the United States, and a resident of Clifton, in the county of Passaic and State of New Jersey, have invented a new and Improved Machine for Cutting and Feeding Tire-Making Fabric, of which the following is a full, clear, and exact description.

The present invention relates to machines for cutting, splicing and feeding tire making fabric and it has for its object to produce a machine by means of which a coated strip of canvas, or other woven textile material which, as it comes from the coating machine has its threads running longitudinally and transversely of the strip, may be cut on the bias into short sections, and such sections united to form strips of predetermined length and advanced through the machine, thus producing strips in which the threads shall run diagonally from side to side, and whereby strips of the required length may be produced, and delivered directly to a machine for building up tire blanks.

The present machine is particularly adapted to operate in conjunction with the tire blank building machine disclosed in a companion application filed herewith, Serial No. 364,534, and the object of the present invention is to assure a continuous supply of tire making fabric strips of the required length having the threads running at an angle transversely thereto, for use in the manufacture of cylindrical tire blanks by such tire blank building machine.

A further object of the invention is to produce a machine for cutting and splicing sections of fabric to produce a so-called bias strip of the required length to be wrapped around a mandrel or drum in building up a cylindrical tire blank, and to progressively and automatically increase the length of successive strips so that they will be adapted to completely encircle and be superimposed upon preceding strips which have been wrapped about the mandrel or drum in building up successive layers, so that the ends of each strip may be brought together and form a butt joint, as the successive layers are wrapped about and superimposed upon preceding layers in building up the cylindrical blank from which the casings or shoes are ultimately formed.

To the above ends the present invention consists of primary and secondary strip advancing instrumentalities arranged at an angle to each other, with suitable stops or gauges for determining the extent of the advance of the fabric, together with suitable cutters co-operating with the primary and secondary strip advancing instrumentalities to sever the strips of fabric; and it further consists of an automatic gauge co-operating with the secondary strip advancing instrumentalities and cutter whereby the successive strips cut from the bias strip may be progressively lengthened as the diameter of the built-up tire blank increases.

The present invention further consists of the devices and combinations of devices which will be hereinafter described and claimed.

The present invention is illustrated in the accompanying drawings in which.

Similar reference characters will be employed throughout the following specification, and on the drawings, to designate corresponding parts.

In order that the following specification may be clearly understood the term "straight strip" will be employed to designate the strip of fabric operated upon by what has been hereinbefore referred to as the primary strip advancing and cutting mechanism, and such mechanism will be referred to as the "straight strip" feeder or cutter as the case may be, and the term "bias strip" will be used to designate the strip made up of the sections cut from the straight strip; and what has been hereinbefore referred to as the secondary strip advancing and cutting mechanism, will be hereinafter designated as the "bias strip" feeder or cutter, as the case may be; in other words, that portion of the machine which operates upon the "straight strip" of fabric as it comes from the roll will be identified because of its operation on the straight strip and the portions of the machine which operate upon the strip which is formed by the uniting of the adjacent edges of the sections cut from the straight strip will be identified by reason of its operation on the bias strip.

The machine comprises a suitable frame or support which will be of suitable size and shape to support the operating parts, and of course may be made of any suitable material.

In the drawings a simplified form of frame is illustrated, and comprises vertical uprights or standards placed in desired positions with relation to each other, with cross-heads connecting such standard, where required, and with longitudinal connections to secure rigidity, all as will be hereinafter particularly described.

At the right hand end of the machine (see Figure 1) are the vertical standards (1) which are fixedly secured to the floor, and in which are suitable bearings (2) supporting the mandrel (3) of the roll of fabric (4).

Figures 3, 4:
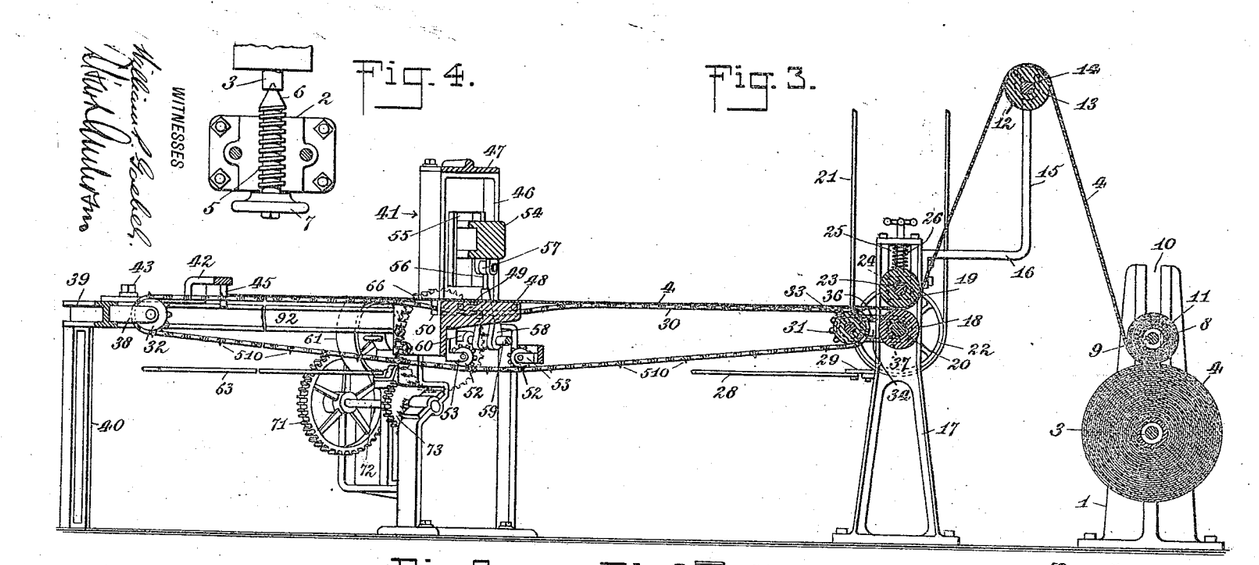
Figure 3 shows a broken vertical sectional view taken on the line 3—3 in Figure 1, of that part of the machine which has been referred to as the primary strip advancing instrumentalities.
Figure 4 is a detail showing one of the trunnions which supports the roll of fabric at the entering end of the primary strip advancing part of the machine.

One of the supports for the mandrel (3) consists of a threaded trunnion (5) pointed at its inner end (6), and carrying at its outer end a hand wheel (7), the threaded trunnion engaging a threaded bore in one of the bearings (2). This arrangement provides for releasing the empty mandrel (3) and the insertion of a new roll and mandrel, all as will be clear to those familiar with such constructions.

Figure 11:
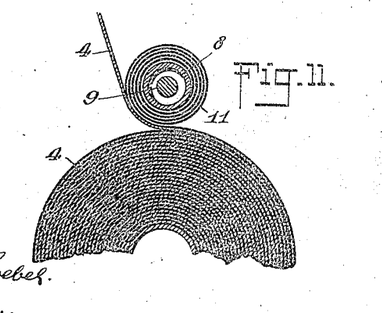
Figure 11 is a detail of the strip of fabric as it is fed into the primary and strip advancing part of the machine and illustrating a superimposed roller, upon which is wound the protecting layer of fabric which is employed in making up rolls of coated fabric, so that the superimposed layers will not adhere to each other, the protecting layer being wound upon the upper roll as the coated fabric is unwound from the lower roll.
Figures 12, 13, 14, 15:
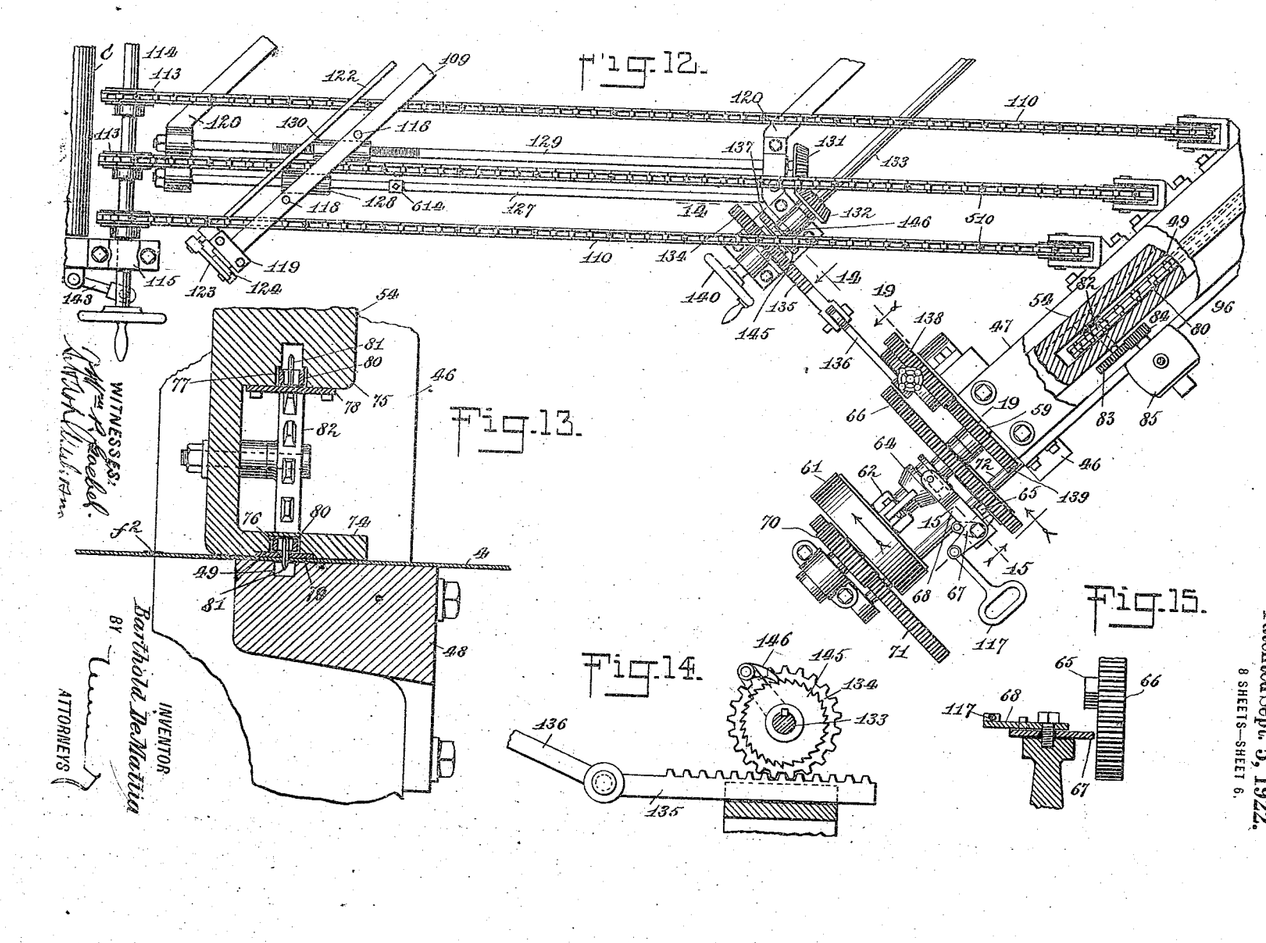
Figure 12 is an enlarged sectional detail of the secondary cutting mechanism and the strip advancing instrumentalities for the bias strip, parts being shown in plan.
Figure 13 is an enlarged vertical sectional view of a portion of the secondary cutter for the bias strip, the view being taken on line 13—13 in Figure 20, looking in the direction of the arrow in the figure.
Figure 14 is a detail of the mechanism for automatically advancing the gauge for the bias strip, the view being a sectional view taken on the line 14—14 in Figure 12.
Figure 15 is a detail partly in elevation, and partly in section of the controlling mechanism for the clutch of the secondary cutter, the view being a sectional view taken on the line 15—15 in Figure 12.

The roll of fabric (4) as it comes from the coating machine consists of a strip of canvas or other woven textile material, which is coated and thoroughly saturated with rubber in a more or less plastic condition, and in order to prevent the layers from sticking together, a protecting strip is employed which is wound up with the coated fabric. As the coated fabric is drawn off to be cut up, as will be hereinafter described, the protecting strip will be wound about a roller (8) carried by a mandrel (9) supported in vertical slots (10) in the upper end of the standards (1) and under the force of gravity drops upon, and is held in contact with the roll (4) as it is revolved, thus causing the protecting fabric strip (11) to be wound upon the roller (8).

From the roll the strip of coated fabric (4) passes upwardly over a guide roll (12) removably supported by means of its shaft (13) in forked bearings (14) supported by brackets (15), the arms (16) of which are fixed to the upper ends of the vertical standards (17) arranged in advance of, and parallel to, and in line with, the standard (1).

The standards (17) support the feed rollers (18 and 19), by means of which the strip of fabric (4) is drawn from the roll as required, and advanced to be cut into sections, as will be hereinafter described.

The feed roll (18) is mounted upon a shaft (20) which is driven by a belt (21) which engages a pulley (22) upon one end of the shaft (20), the belt (21) being driven from any source of power.

The upper feed roll (19) is also a pressure roller and is carried by shaft (23) mounted in boxes (24) which have a vertical sliding movement in slotted bearings (25) formed in the upper ends of the standards (17), and the pressure of which is adjusted by suitable spring adjusting devices (26) to insure the effective gripping of the strip of fabric (4), and its removal from the roll of fabric, and its advance to other instrumentalities, as will be hereinafter described.

A suitable clutch mechanism (27) is interposed between the belt pulley (22) and the shaft (20), such clutch being controlled by the operator by means of a rod (28) and lever (29) whereby the feed rolls may be started and stopped as required.

The fabric (4) as it comes from the roll has its threads running longitudinally parallel with its edges, and also transversely at right angles to its edges as is customary with such fabrics as they come from the loom. In the manufacture of casings or shoes for pneumatic tires, however, in order that the crossed threads may move and shift with relation to each other, in conforming such fabric to the curvature of the casing or shoe, such strip of straight fabric must be converted into what has been described herein as a bias fabric or bias strip, that is to say a strip in which the threads crossing each other at right angles, run in an angular or diagonal direction transversely across the fabric. In other words, in such bias strip each thread is angularly disposed with relation to the parallel edges of the bias fabric strip. The first cutting operation therefore, of the present machine, cuts from the strip of straight fabric, sections of the required length to produce a strip of the desired width, the forward end of the strip having first been cut on a diagonal line extending from one corner of the forward end to a point on the opposite edge inwardly from the point or corner the required distance to produce the desired bias or bevel of the end. This provides the advancing end of the straight fabric strip (4) with a beveled forward end. This cutting of the end of the fabric may be accomplished by the first cutter, which will be hereinafter described, or it may be produced by separate and other mechanism.

Assuming that the fabric as it comes from the roll has not previously been cut, from the feeding rollers (18 and 19) it will be advanced to rest upon the feeding instrumentalities consisting of a plurality of parallel link chains (30). These chains (30) are supported upon sprocket wheels (31 and 32), the sprocket wheels (31) being carried by a driven shaft (33) supported in bearings in the forward end of bracket arms (34), and carrying at one end a sprocket wheel (35) which, by means of a chain (36), is driven by a sprocket wheel (37) (see dotted lines Figure 3) mounted upon the shaft (20).

By this arrangement the parallel chains (30) will be driven to advance the fabric resting thereon and supported thereby, at the speed of rotation of the feed rolls (18 and 19).

Figure 1:
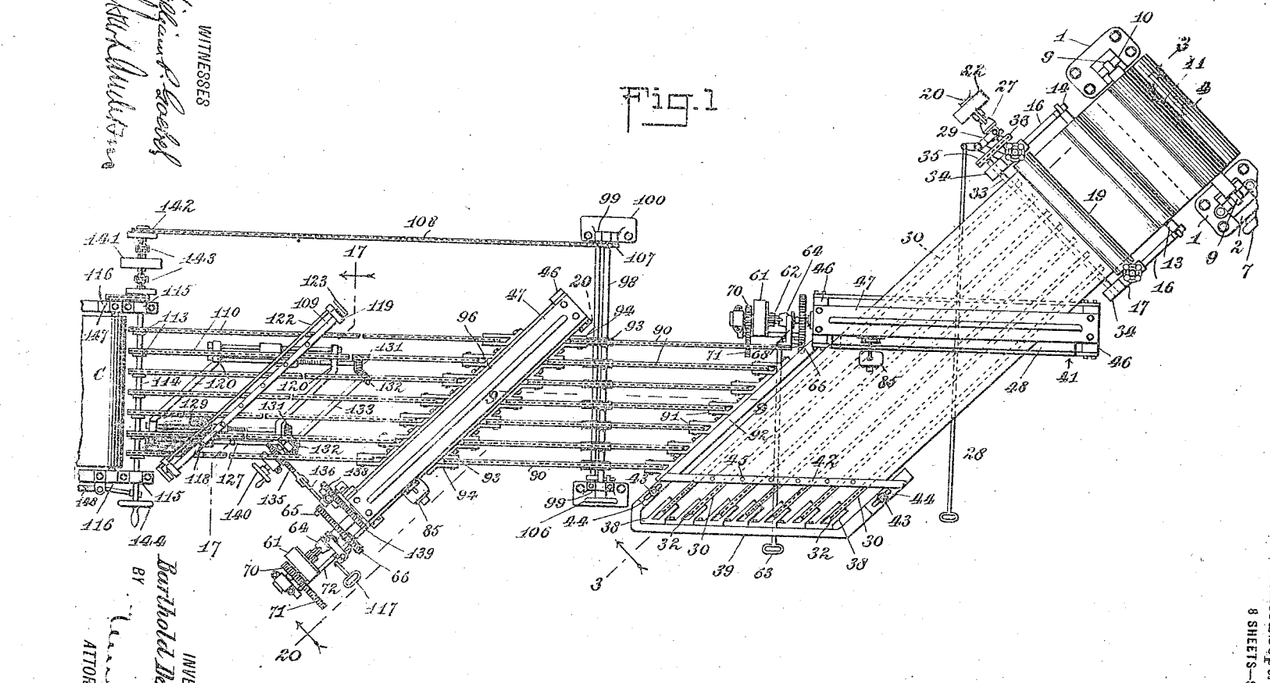
Figure 1 shows a broken top plan view.
Figure 2:
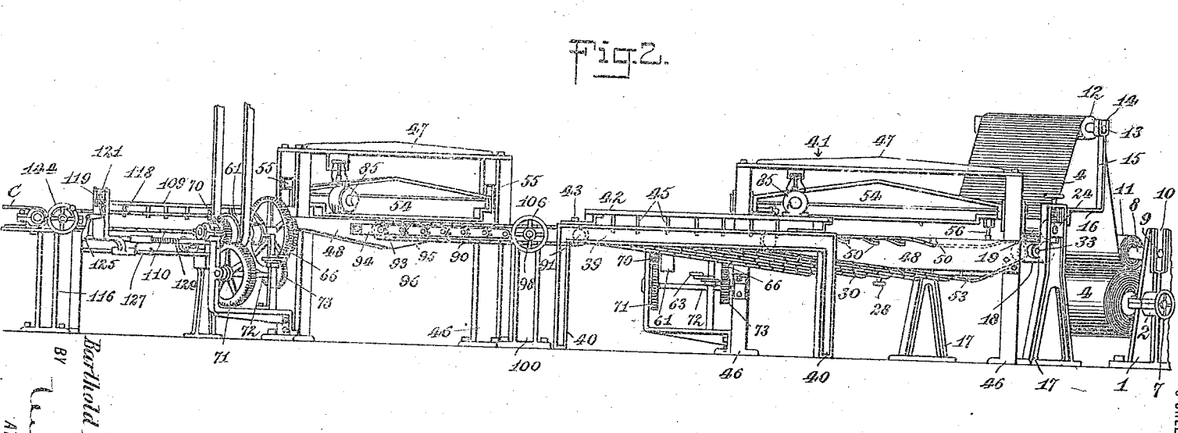
Figure 2 shows a side elevation and partial perspective, as though the observer was looking at the right hand side of the machine, as shown in Figure 1.

The sprocket wheels (32) are supported in brackets (38) carried by a yoke (39) supported at the upper end of standards (40), the yoke (39) and standards (40) constituting the end of that portion of the machine which is angularly disposed with relation to the remaining portion as shown in Figure 1.

The supporting and advancing chains (30) feed the end of the straight strip as it comes from the feeding rollers (18 and 19) through a cutting mechanism (41) until the forward beveled end of the straight strip engages a suitable stop or gauge, shown as comprising an overhanging bracket (42) adjustably supported by bolts (43) passing through slots (44) and provided with depending stop pins (45) projecting downwardly from the cross-piece (42) into the spaces between the parallel chains (30). By adjusting the gauge towards and from the cutting mechanism (41), the length of the bias pieces cut from the end of the straight strip (4) may be regulated, whereby to secure the desired width of bias strip to be formed by the splicing of the bias pieces.

Figure 8:
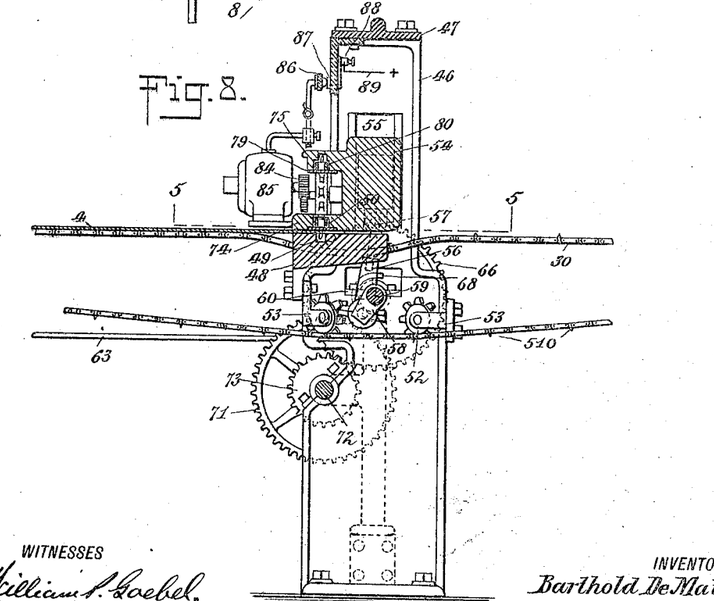
Figure 8 is a vertical sectional view taken on the line 8—8 of Figure 1 through the primary strip cutter.
Figure 9:
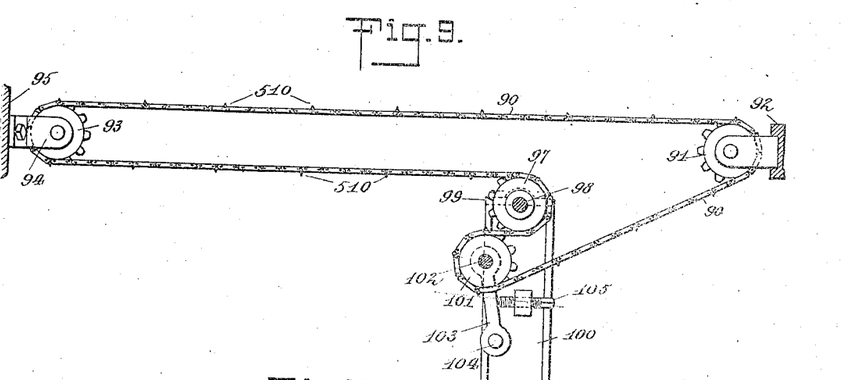
Figure 9 is a detail of the secondary strip advancing mechanism, the view being a sectional view taken on the line 9—9 of Figure 1.

The cutting mechanism (41) is located between the feeding rolls (18 and 19) and the gauge (42) and is so positioned that it occupies that relation to the line of travel of the straight fabric required to sever the fabric on a diagonal line to produce bias sections therefrom. This cutting mechanism (41) comprises a suitable frame consisting of the upright standards (46) connected at their upper ends by a cross-brace (47). The standards (46) support a bed plate (48) which extends across and between the standards (46). The bed plate (48) in its upper surface is provided with a groove (49) which extends across the bed plate (48) from end to end thereof. The fabric (4) to be cut, passes over the bed plate (48) and the groove (49), as clearly shown in Figure 3 of the drawings. The upper run of the chains (30) is deflected to pass beneath the upper surface of the bed plate (48) and the groove (49), as shown clearly in Figures 3 and 8 of the drawings, and thus positioned so as not to interfere with the cutting operation.

Figures 5, 6:
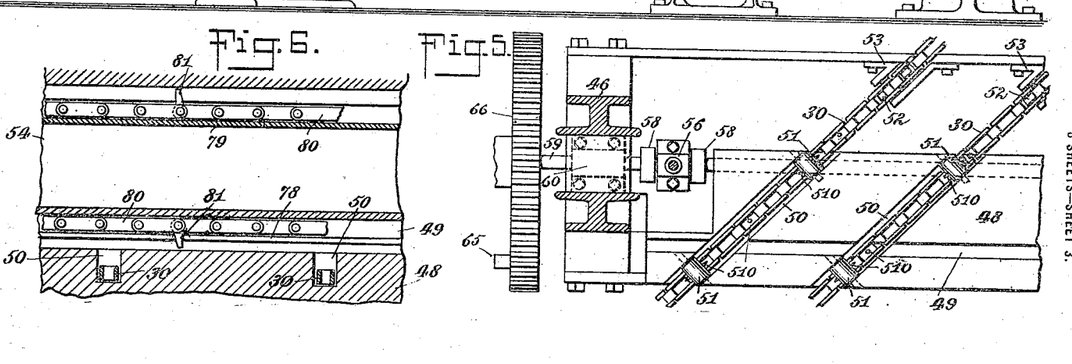
Figure 5 shows a horizontal sectional view, with parts shown in top plan view, of the initial strip conveying mechanism and the initial strip cutter.
Figure 6 is a sectional view of a portion of the cutting mechanisms.
Figure 7:
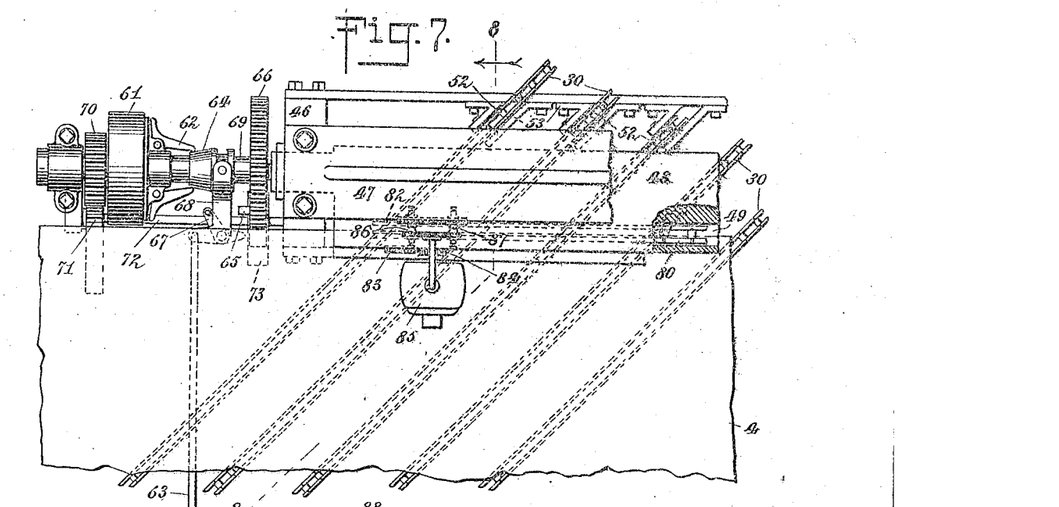
Figure 7 is an enlarged view, partially in plan, and partially in section, of portions of the primary strip cutter and its operating instrumentalities.

Any suitable means may be adopted for deflecting the upper run of the chains (30), such as providing the bed plate (48) with grooves (50) in its upper surface in which are placed rollers (51) beneath which the chains (30) are passed and caused to travel in a path below the bottom of the groove (49), the groove (49) being crossed in a diagonal direction by the grooves (50). (See Figure 5 of the drawings.)

The lower run of the chains (30) is also deflected as they pass beneath the cutting mechanism (41) by means of idle sprockets (52) supported in brackets (53) whereby to provide freedom of movement for the operating mechanism of a reciprocating cross-head which carries the cutter.

By the foregoing arrangement the strip of fabric (4) is carried through the cutter (41) by a continuous feeding mechanism which, as it passes through the cutting mechanism, is deflected below the path of movement of the cutter so as not to interfere with its operation.

The cross-head (54) has a vertically reciprocating movement in slots (55) in the upper ends of the standards (46) and is moved up by links (56) pivotally connected as at (57) to the under side of said cross-head at opposite ends (see Figures 3 and 8), the links (56) being pivotally connected at their lower ends to short cranks (58) of a crank shaft (59), the crank shaft (59) extending transversely beneath the bed plate (48) and mounted at opposite ends to turn in suitable bearings (60) supported by the vertical standards (46).

At one end the crank shaft (59) carries a belt pulley (61) which is driven by a belt from any suitable source of power and a suitable clutch mechanism (62) controlled by a rod (63) is interposed between the belt pulley (61) and the crank shaft (59) whereby the movements of the crank shaft to raise and permit the lowering of the cross-head (54) are controlled by the operator. The clutch mechanism (62) may be of any desired form and need not be specifically described excepting to state that it comprises a sliding cone (64) which will be operated by the rod (63) to throw in the clutch to raise and lower the cross-head (54) and will be automatically tripped to disconnect the clutch by a stud (65) projecting from a gear wheel (66) which engages a bell crank trip lever (67) to trip the clutch operating lever (68) after each cycle of movement.

The belt pulley (61) is loosely mounted on a sleeve (69) which carries a pinion (70), splined thereto, which meshes with the gear (71) fixedly carried at one end of a rotating shaft (72). The opposite ends of the rotating shaft (72) carries a pinion (73) which meshes with the gear (66) splined to the crank shaft (59). By this arrangement the reciprocating movements of the cross-head (54) are considerably accelerated while obviating the necessity of directly driving the belt pulley (61) at a speed greater than that of the other directly driven elements.

The cross-head (54) is provided with rearwardly projecting, horizontally disposed parallel projections (74 and 75) which, upon their under surfaces are grooved longitudinally to form the guides (76 and 77) closed by plates (78 and 79), within which guides there is fitted an endless chain (80) provided at intervals with projecting cutters (81). The cutters (81) at the lower run of the chain (80) project through a slot formed in the plate (78) in position to enter the groove (49) in the bed plate (48), and to engage and sever the material resting upon the upper surface of the bed plate, when the cross-head (54) is lowered. The endless chain (80) bearing the cutters (81) passes at its opposite ends about sprocket wheels (82) mounted in the cross-head (54), and one of these sprocket wheels (82) carries a gear (83) which is in mesh with, and driven by a pinion (84), carried by the shaft of an electric motor (85) mounted upon and partaking of the movements of the cross-head (54).

The electric motor is intended to be operated to drive the cutter chain upon the lowering of the cross-head (54) at the time the cross-head (54) is in its lowermost position to clamp the material and with the cutters projecting into the groove (49), and to be stopped as soon as the cross-head (54) begins its upward movement, and for this purpose the motor is provided with a contact piece (86) arranged to engage a contact piece (87) electrically connected to the posts (88) which, by means of conductors (89) receive electric power from any suitable source.

The cross-head (54) is permitted to drop by gravity and must remain down a sufficient length of time to permit the cutters to operate and to secure this result the links (56) are formed of two telescoping sections and upper section (57) having a rod sliding in a sleeve of the lower section thus providing for the free movement of the crank shaft while the cross-head remains lowered for a sufficient time to permit the operation of the cutters.

The foregoing arrangement is such that a shifting of the clutch mechanism (62) will, through the train of gears which has been described, rotate the crank shaft permitting the cross-head (54) to drop to clamp the material on the upper surface of the bed plate. When the cross-head has reached its clamping position the electrodes will be in contact, thus starting the electric motor (85) and driving the chain (80) which carries the cutters (81) which sever the fabric after which the links (56) will return the cross-head (54) to its elevated position carrying with it the motor, which will cease operation as soon as the electrodes are out of contact with each other, and as the cross-head (54) reaches the extreme of its upward movement the clutch will be operated by means of the stud (65) and the intermediate mechanism, whereby the crank shaft will be released from the sleeve (69) and the belt pulley (61) may continue to run without imparting movement to these parts.

Figures 20, 21:
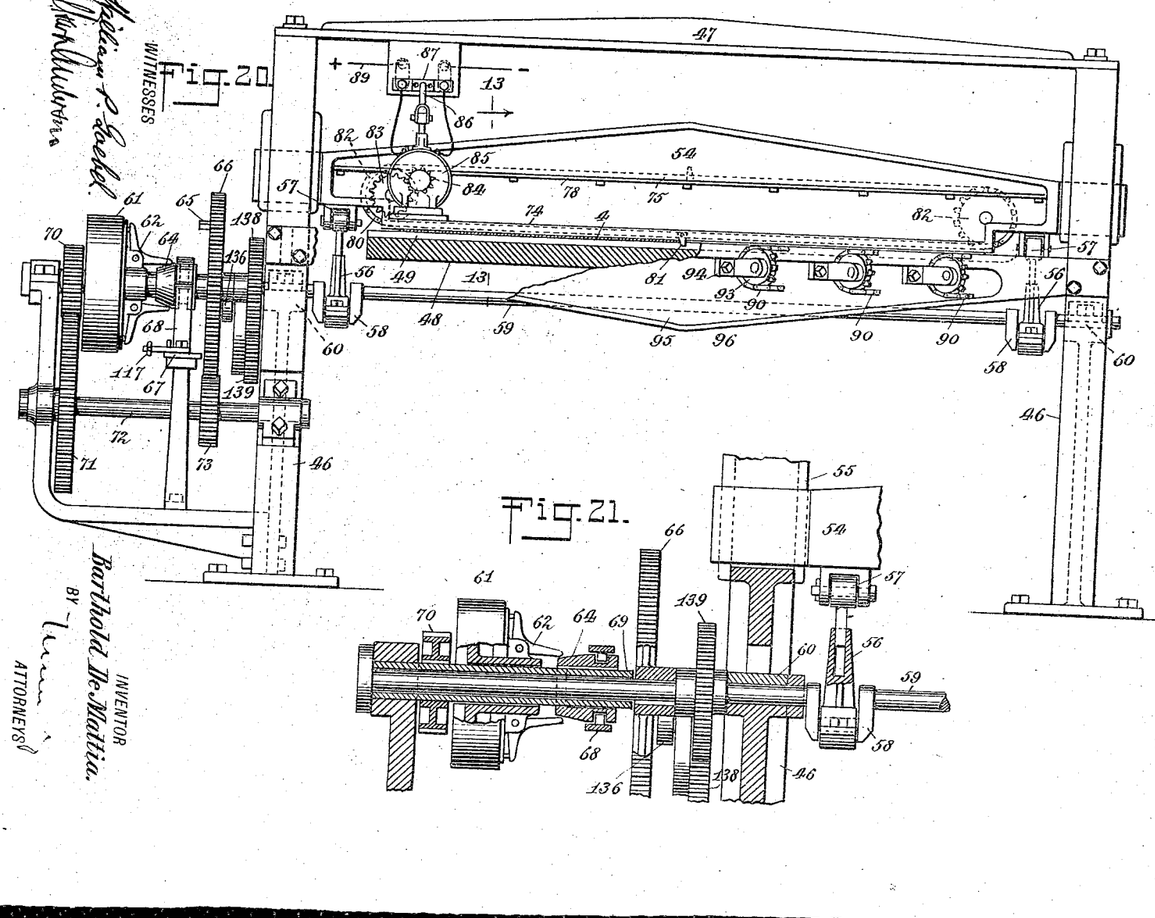
Figure 20 is an enlarged view partially in section and partially in front elevation, of the bias strip cutter the view being taken on the line 20—20 in Figure 1.
Figure 21 is a view partially in vertical section and partially in elevation of details of the clutch and other mechanism of the bias strip cutter.

In describing the cutter (41) parts of the operating mechanism of the cutter which severs the bias strip, as shown in Figure 20, have been specifically referred to, it being understood that in so far as the cross-head operating means, the bed plate, and the cutter is concerned, these two cutting mechanisms are exactly the same, and that some of the details of each of the cutting mechanisms have been omitted from the illustrations of the respective cutting mechanisms.

As so far described the mechanism acts upon and cuts into bias sections the strip of straight fabric, and supposing that a section has been cut, it will now be moved into that portion of the machine which receives and operates upon the bias strip composed of a number of bias sections cut from the straight strip.

This portion of the machine consists of a plurality of independently extending parallel chains (90) supported at one end by a series of sprocket wheels (91) carried by a frame piece (92) and a series of sprocket wheels (93) carried by brackets (94) attached to a brace (95) of the second cutting mechanism (96). (See Figure 20 of the drawings).

It will be noted that the longitudinal line of this portion of the machine is at an angle to the longitudinal line of the first portion and that the cutter (96) crosses the longitudinal line of this portion of the machine in a direction parallel to the longitudinal line of the first portion of the machine.

The chains (90) in their lower run, pass over and about sprocket wheels (97) mounted upon a driving shaft (98) supported in bearings (99) at the upper end of vertical standards (100), and also pass about idle sprocket wheels (101) mounted on a shaft (102) supported in rocking arms (103) which are pivotally mounted at (104) to the vertical uprights (100) engaged by set screws (105) whereby to adjust the tension of the chains (90). The shaft (98) carrying the sprockets (97) is provided at one end with a hand wheel (106) whereby it may be turned in either direction to move the piece of fabric thereon back or forth, as desired.

The shaft (98) also carries at one end a sprocket-wheel (107) which is engaged and driven by a chain (108) which at times is positively driven for the purpose of positively advancing chains (90) with the fabric mounted thereon.

Assuming that a piece of fabric (f) has been cut from the strip (4), as the machine is shown in Figure 1, the operator moves this strip of fabric in the direction of the chains (90) until the forward edge or the left hand edge of the piece of fabric (f) (looking at Figure 1) rests upon the chains (90), whereupon the rotation of the shaft (98) advances this strip of fabric (f) until it clears that portion of the machine lying between the cutting mechanism (41) and the gauge (42). This leaves the space between the cutting mechanism (41) and the gauge (42) free and clear in condition to permit the advance of another section of the straight fabric (4) to be cut off by the cutting mechanism (41) forming another section ($f^1$) of bias fabric.

Figure 10:
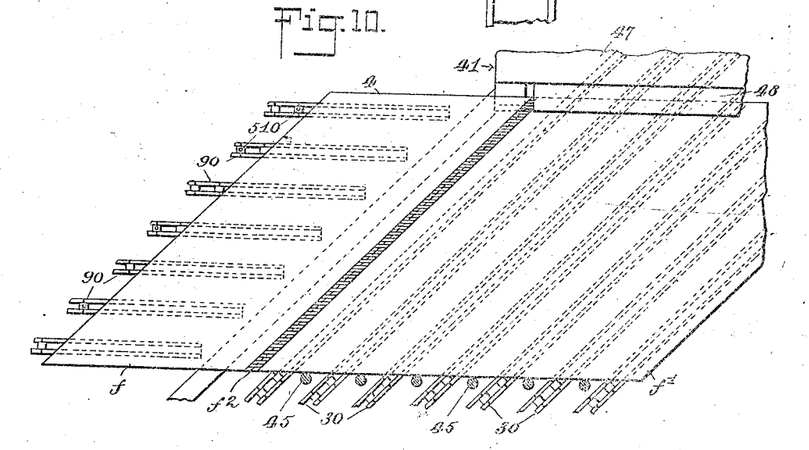
Figure 10 is a plan of a detail showing portions of the primary and secondary strip advancing instrumentalities, and illustrating the stitching or uniting of adjacent and successive bias sections.

Having cut off this other section ($f^1$), the operator now by means of the hand wheel (106) turns backward the supporting and feeding chains (90) with the section of fabric (f) thereon, until the meeting edges of the sections (f) and ($f^1$) abut, and unites them as by an adhesive strip ($f^2$). (See Figure 10).

This uniting of the edges is effected because of the inherent adhesiveness of the rubber coating, and while no sewing operation is performed thereon, this operation is generally known in this art as "stitching."

After the formation of the bias strip by uniting a number of the sections (f) and ($f^1$), the operation of the shaft (98) by its power driven mechanism, to be hereinafter described, and of which the chain (108) and the sprocket wheel (107) forms a part, advances the strip of bias fabric formed by the uniting of the sections, in the direction of the travel of the chains (90), and passes it beneath and through the second cutter (96), and this operation is repeated until the forward beveled end of the bias strip comes into contact with the gauge (109) at which time the second cutter (96) is operated to sever the strip of bias fabric in varying lengths.

After passing through the second cutter (96) the bias strip is received, supported and advanced by another group of chains (110) which at one end pass over sprocket wheels (113) mounted upon a shaft (114) mounted in suitable bearings (115) at the upper end of vertical standards (116). (See Figures 1, 2, 12, 16 and 17).

It will be noted that the shaft (114) extends parallel to the shaft (98) and at right angles to the direction of movement of the strip of bias fabric, and at the extreme forward ends the chains (110) pass beneath and beyond the gauge (109) at which point the bias strips are delivered to a suitable conveyor (C) which receives such strips and delivers them to any point desired, but preferably to a machine for forming cylindrical tire blanks which constitutes the subject matter of a companion application filed of even date herewith, Serial No. 364,534.

Like the cutting mechanism (41) the cutting mechanism (96) comprises uprights or standards (46) connected at their upper ends by a cross-brace (47), and a bed plate (48) having upon its upper surface a cutting groove (49), but in this instance as the chains do not pass through the cutting mechanism, there is no provision for deflecting the chains and like the cutting mechanism (41) the cutting mechanism (96) is provided with a cross-head (54) carrying the same form of motor driven cutter carrying chain (80) and cutters (81) driven by an electric motor (85), the operation of which is controlled by electrical connections which have been described, and the cross-head (54) is raised and lowered by means of a crank shaft (59) carrying the cranks (58) with the telescopic links (56) connecting the crank shaft and the vertical movable cross-head (54). The crank shaft (59) is driven by a belt pulley (61) and the clutch and gear mechanisms are substantially the same as has been heretofore described in connection with the cutting mechanism (41). A hand rod (117) is provided by means of which the clutch is thrown into operation.

The gauge (109) comprises a horizontal bar extending diagonally across the chains (110) from which depend stop pins (118), the bar (109) having a vertical movement in the slotted ends (119) of the arms (126) so that the stop pins (118) may be moved up and down to position the lower end of the stop pins (118) above and below the plane of the upper run of the chains (110) (see Figure 17) and the bar (109) is normally held in its lowermost position by means of springs (121) within the slotted bearings (119) and bearings on the opposite ends of the bar (109).

Figures 16, 17, 18, 19:
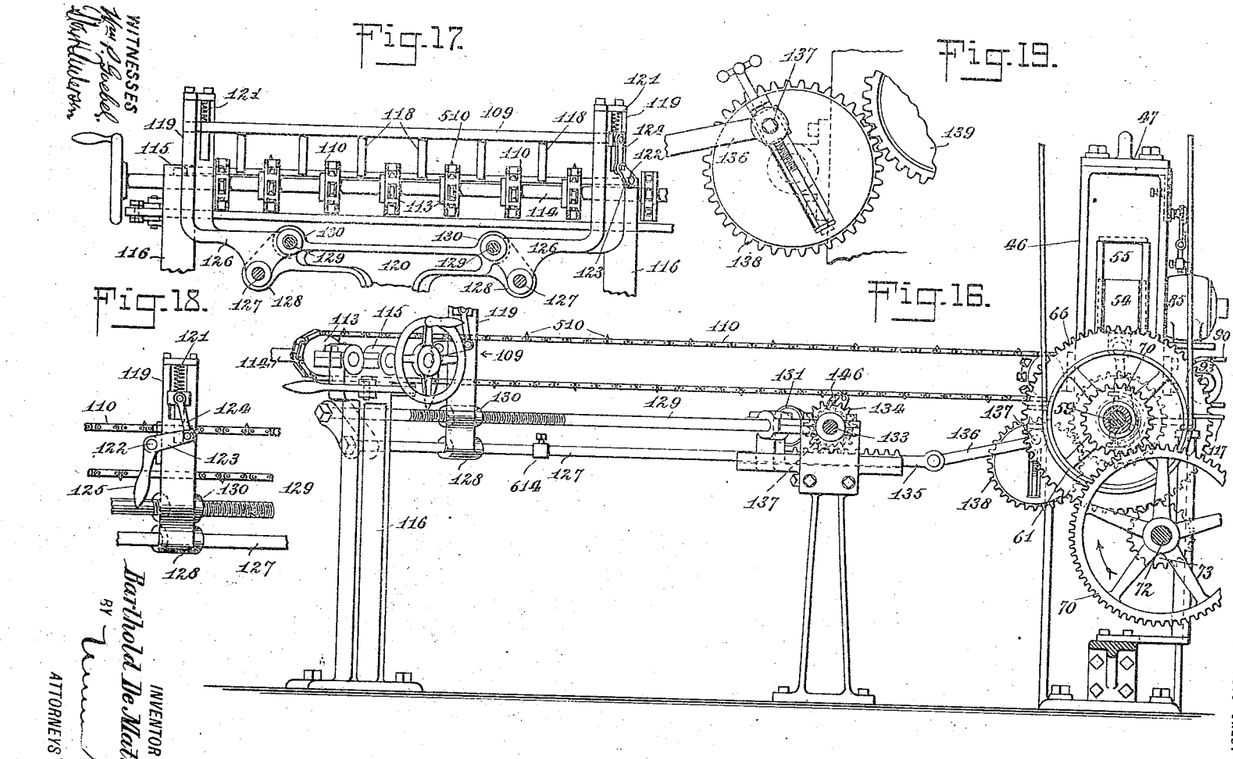
Figure 16 is a view showing partially in vertical section, and partially in side elevation and perspective, the bias strip advancing and gauge operating devices.
Figure 17 is a front elevation and partial sectional view of the bias strip advancing instrumentalities and the automatic guage for the bias strip, the view being taken on the line 17—17 in Figure 1.
Figure 18 is a detail of the guage shown in Figure 17, showing means for elevating the guage.
Figure 19 is an enlarged detail of the adjustable connection of the guage operating instrumentalities.

The bar (109) and stop pins (118) are normally held in the position shown in Figure 17 so as to place the lower ends of the pins (118) in the path of movement of the strip of bias fabric as it comes from the cutter (96) so as to position the forward end of such strip relatively to the cutter (96) to regulate the length of the piece which shall be cut from such strip. After being cut off, the gauge (109) is elevated so as to permit the chains (110) to carry the piece of fabric cut off beneath the gauge and deliver it to the conveyor (C). Any suitable means may be employed to elevate the gauge, that shown in the drawings comprising a shaft (122) carrying on its opposite ends crank arms (123) which are pivotally connected to short links (124), which are in turn pivotally connected to the ends of the bar (109), and one of the crank arms is provided with a handle (125) by means of which the shaft (122) may be rotated and by means of the crank arms (123) and links (124) raise the bar (109) sufficiently to position the lower ends of the stop pins (118) above the plane of the chain (110) and the piece of fabric carried thereby.

The distance between the gauge or stop and the cutter (96) determines the length of the piece of bias fabric cut from the forward end of the strip, and as these pieces must vary in length and be progressively lengthened, to insure that as the cylindrical tire blank is built up the succeeding and superimposed layers shall be of a length to entirely surround the cylinder or drum on which the tire blank is made up, I have provided means for automatically changing the position of the gauge with relation to the cutting mechanism (96) controlled by such cutting mechanism, so as to advance the gauge and position it at a greater distance from the cutting mechanism (96) after each cutting operation.

For this purpose the arms (126) which support the gauge are mounted upon rods (127) supported in the standards (120) and along the rods the arms (126) may travel freely, the arms being provided with bearings (128) fitting the rods (127). Threaded shafts (129) engage threaded bearings (130) in the arms (126), and are mounted to turn in suitable bearings supported by the standards (116). These threaded rods at their forward end are provided with beveled gears (131) which mesh with and are driven by beveled gears (132) carried by a shaft (133).

The shaft (133) carries at one end a gear (134) meshing with a reciprocating rack bar (135), which rack bar is pivotally connected to a link (136) which is connected by means of an adjustable connection (137) to a gear (138) driven by a gear (139) mounted on the crank shaft (59) of the cutting mechanism (96). The gear (134) carries a ratchet wheel (145) which is arranged to be engaged by a pawl (146) carried by the gear (134) which is loose on the shaft (133) whereby the reciprocating rack bar (135) will, in its movement in one direction rotate the shaft (133), and by means of the beveled gears rotate the threaded shafts (129) to impart movement to the gauge (109).

It will of course be understood that as the gear (138) is driven from the cutting mechanism (96), the gauge will be advanced a short distance for each cycle of operation of the cutting mechanism (96) and that the length of the advance movement, may be accurately adjusted by the adjustable connection (137) by shifting the pivotal point and positioning it varying distances from the centre of the shaft which carries the gear (138).

After the required number of pieces of bias fabric have been cut to build up the cylindrical tire blank of the required number of layers, the gauge (109) is reset, which is accomplished by means of the hand wheel (140) carried by the shaft, adjustable collars (614) are fitted to the rods (127) to determine the initial position of the gauge (109).

The shaft (114) carries a belt pulley (141) driven by belt from any suitable source of power, and at one end it carries a sprocket wheel (142) which drives the chain (108), which in turn drives the shaft (98) whereby the chains (90 and 110) are positively driven. The belt pulley (141) is controlled by a double clutch mechanism (143) whereby it may either be connected to drive the chains (110 and 90) or engage and drive the chains (110) and by means of a chain (147) drive the conveyor (C) and without driving the chains (90); also when the clutch (143) is in a neutral position, the operator may turn the shaft (114) by means of a hand wheel (144) carried by the end of the shaft (114) by means of which the chains (110) may be moved in either direction by hand and may also shift the gauge as described.

It will of course be understood that the clutch (143) will be provided with suitable operating devices (148) under the control of the operator.

It will be noted that in the operation of the present machine every operation is under the direct control of the operator and that relatively simple, more or less automatic devices are provided whereby a strip of straight fabric may be cut up into sections and transformed into a strip of bias fabric which is then cut into sections by what is practically a continuous operation.

In operation the operator by means of the clutch controlling rod (28) causes the feed rollers (18 and 19) to draw from the roller a strip of straight fabric and assuming that the end has not already been cut off on a diagonal line the strip will be advanced until it passes over the cutting bed of the initial cutter (41) a sufficient distance to permit the diagonal cut to be made. When the strip has been advanced to this extent the feed rollers and feeding chains (30) are stopped.

The operator now through the clutch control (63) throws in the clutch of the initial cutter which causes a rotation of the crank shaft permitting the cross-head (54) to drop to clamp the material on the upper surface of the bed plate at which time the electric motor (85) is started and the cutter chain operated to drive the cutters across the fabric and sever it on a diagonal line after which the cross-head is returned to its uppermost position and the clutch automatically operated to disconnect the crank shaft from the driving mechanism.

After the end has been cut off the operator will again cause the advance of the strip by the operation of the feed rollers (18 and 19) and feeding chains (30) until the beveled end of the strip reaches the gauge (42) at which time the advance of the strip will be stopped and the initial cutter again operated to sever from the forward end of the strip a bias section.

At this point the operator advances the bias section until it rests upon the chains (90) whereupon the chains (90) may be positively driven by the chain (108) or if the clutch (141) is in a neutral position the chains may be operated to advance the bias section by means of the hand wheel (106).

In any event the bias section is removed from the chains (30) and rests upon the chains (90) leaving the space between the initial cutter and the gauge (42) free to receive the advancing end of the straight strip of fabric.

At this point assuming that the fabric has been advanced until its beveled end engages the gauge (42) another bias section will be cut off and will be connected to the previously cut-off bias section resting upon the chains (90) and this operation will be repeated until a sufficient length of bias strip has been produced so that the forward end of the bias strip resting upon the chains (90 and 110) engages the movable gauge (109). The advance of the bias strip to this point is produced by the positive movement of the chains (90 and 110) through the chain (108) and the clutch (143).

At the time the beveled end of the bias strip engages the gauge (109) the advanced movement of the chains (90 and 110) is stopped by placing the clutch (143) in a neutral position. At this time the operator throws in the clutch controlling the cutter (96) which is operated to cut off a length from the bias strip sufficient for making one layer of a cylindrical tire blank.

The operation of the cutter (96) through the reciprocating rack bar (135) advances the gauge (109) towards the left, as shown in Figure 1, so that a subsequent cutting operation will cut off a section from the bias strip of an increased length.

After the section has been cut off the gauge (109) is elevated to permit the cut-off section to be advanced and this is accomplished by the chains (110) which are operated by the shaft (114) through the clutch (143) at which time the chain (108) is disconnected so that the chains (90) do not move the strip advanced until it is delivered to the conveyor (C) which carries it from the machine.

In order to insure the positive advance of the fabric the chains (30, 90 and 110) and the rollers (51) may be provided with projecting points (510) as indicated in Figures 3, 5, 9 and 16 of the drawings positioned to slightly embed themselves in the coated surface of the fabric. Such points (510) if employed will be placed at intervals along the respective feeding chains.

After the fabric which has been cut off has been delivered to the conveyor (C) by moving the clutch (143) to a neutral position the conveyor (C) may be operated by instrumentalities other than the shaft (144) and the chain (147) without the necessity of moving the chains (90 and 110).

I claim:—

1. In a machine of the class described, in combination, means for advancing a strip of fabric, and a cutting mechanism, comprising a bed plate, a reciprocating cross-head, means to reciprocate the cross-head, a draw cutter carried by said cross-head, means to operate said draw cutter, and means controlled by the movements of the cross-head to control the cutter operating means.

2. In a machine of the class described, in combination, means for advancing a strip of fabric, and a cutter therefor, comprising a bed plate, a reciprocating cross-head, an endless chain carried by said cross-head, a cutter carried by the endless chain, an electric motor for driving the cutter chain, and means controlled by the movements of the cross-head to start and stop the electric motor.

3. In a machine of the class described, in combination, means for advancing a strip of fabric, and a cutting mechanism comprising a bed plate, a reciprocating cross-head, means to reciprocate the cross-head, a cutter carried by the cross-head, and means controlled by the movement of the cross-head to control the cutter operating means.

4. In a machine of the class described, in combination, means for advancing a strip of fabric, a cutting mechanism therefor comprising a bed plate, a reciprocating cross-head, a cutting mechanism carried by said cross-head, a crank shaft and extensible links connecting the crank shaft and cross-head.

5. In a machine of the class described, in combination, means for advancing a strip of fabric in the direction of its length, a stop diagonally disposed across the line of advance and adjustably supported whereby the length of the section cut from the end of the strip may be regulated, a draw cutting mechanism extending diagonally across the line of advance parallel with the stop, means for advancing the fabric cut from the strip in a direction at an angle to the first line of advance, a draw cutting mechanism extending diagonally across the second line of advance and a stop or gage co-operating with the secondary strip advancing and cutting mechanisms for automatically and progressively lengthening the strips cut from the bias strip.

6. In a machine of the class described, in combination, means for advancing a strip of fabric in the direction of its length, a draw cutting mechanism extending diagonally across the line of advance and through which the fabric advancing mechanism passes, means for deflecting the advancing mechanism when it passes through the cutting mechanism to clear the path of the cutter, means for advancing the sections cut from the strip in a direction at an angle to the first line of advance, a draw cutting mechanism extending diagonally across the second line of advance and through which the sections pass for cutting the sections into predetermined lengths, and means for deflecting the second advancing mechanism when it passes through the cutting mechanism to clear the path of the cutter.

7. In a machine of the class described, in combination, a plurality of parallel endless chains for advancing a bias strip of fabric, a draw cutter carried by a reciprocating crosshead and extending diagonally across the line of advance thereof, a gage or stop to engage the forward end of the bias strip, and means to elevate the stop to remove it from the path of movement of the fabric.

8. In a machine of the class described, in combination, a plurality of parallel endless chains for advancing a bias strip of fabric, a draw cutter carried by a reciprocating crosshead and extending diagonally across the line of advance thereof, and means co-operating with the advancing and cutting instrumentalities for automatically and progressively lengthening the strip cut from the bias strip.

9. In a machine of the class described, in combination, two independent strip-advancing mechanisms angularly disposed with relation to each other, two independent draw-cutting mechanisms angularly disposed with relation to each other, an adjustable gage positioned over the first strip advancing mechanism for regulating the width of the piece cut by the first strip cutting mechanism, and means co-operating with the second advancing and cutting instrumentalities for automatically and progressively lengthening the strip cut by the second strip cutting mechanism.

10. In a machine of the class described, in combination, two independent strip advancing mechanisms angularly disposed with relation to each other, two independent draw-cutting mechanisms angularly disposed with relation to each other, an adjustable gage positioned over the first strip advancing mechanism for regulating the width of the piece cut by the first strip cutting mechanism, a gage positioned over the second strip-advancing mechanism to engage the forward end of the advancing strip, means to elevate the stop to move it from the path of movement of the fabric, and means co-operating with the advancing and cutting mechanisms for automatically and progressively lengthening the strip cut by the second strip cutting mechanism.

11. In a machine of the class described, in combination, a plurality of parallel endless carrier chains for advancing a bias strip of fabric, a draw-cutter carried by a reciprocating cross-head extending diagonally across the line of advance thereof, a gage or stop to engage the forward end of the bias strip, means to elevate the stop to move it from the path of movement of the fabric, and means co-operating with the advancing and cutting instrumentalities for automatically and progressively lengthening the strip cut from the bias strip.

BARTHOLD DE MATTIA.